Figure 1:
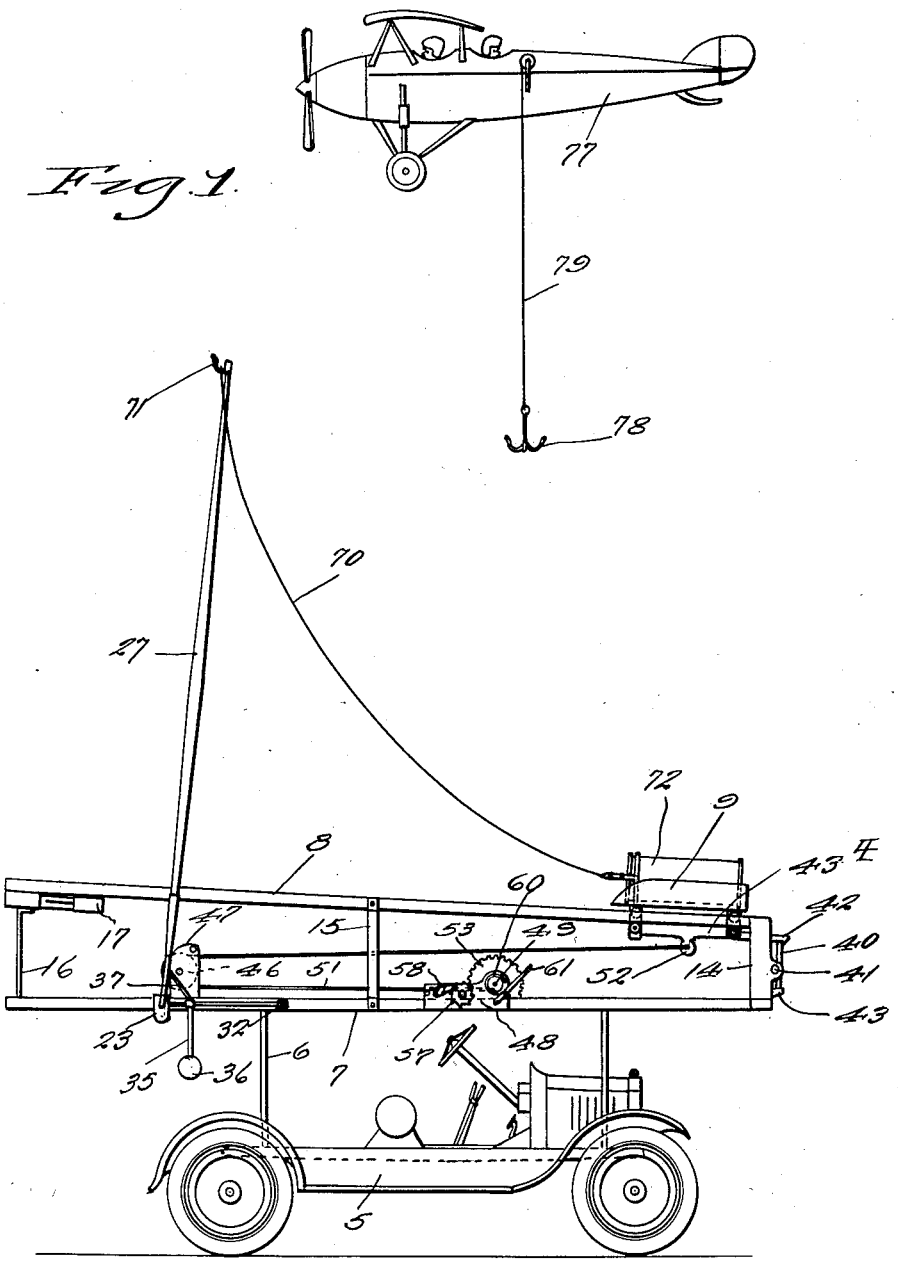

Dec. 27, 1932.  H. G. BUSHMEYER ET AL  1,892,381
AIRPLANE PICK-UP DEVICE
Filed Feb. 23, 1929  4 Sheets-Sheet 1

Inventor
H. G. Bushmeyer
A. W. Card
By Norman B Landrian
Attorney

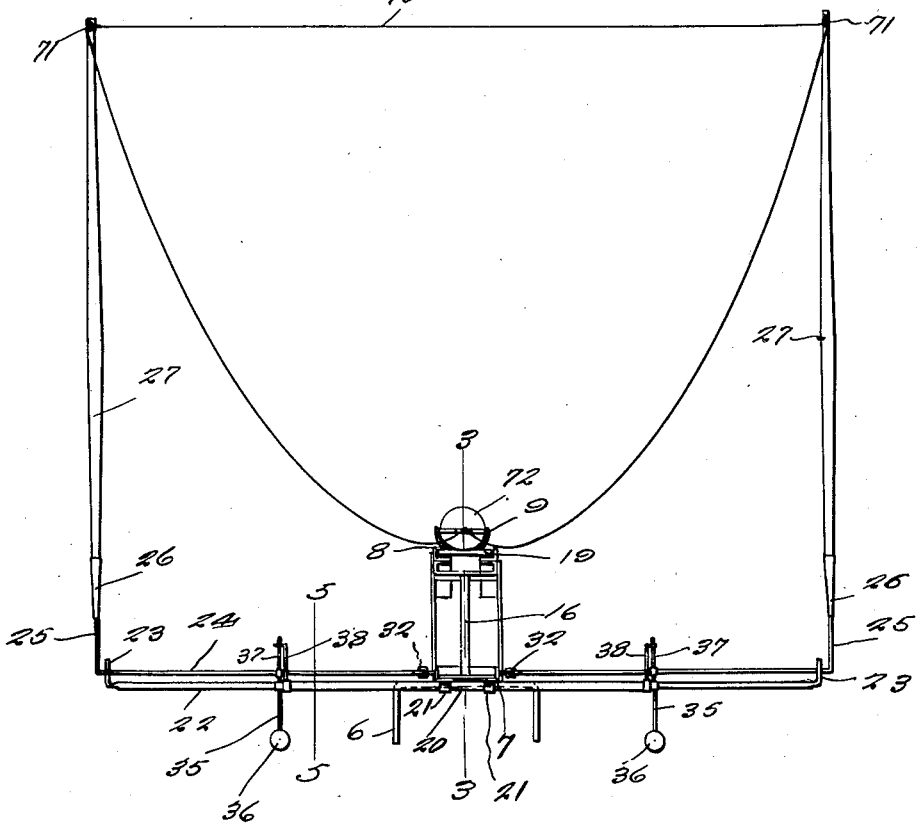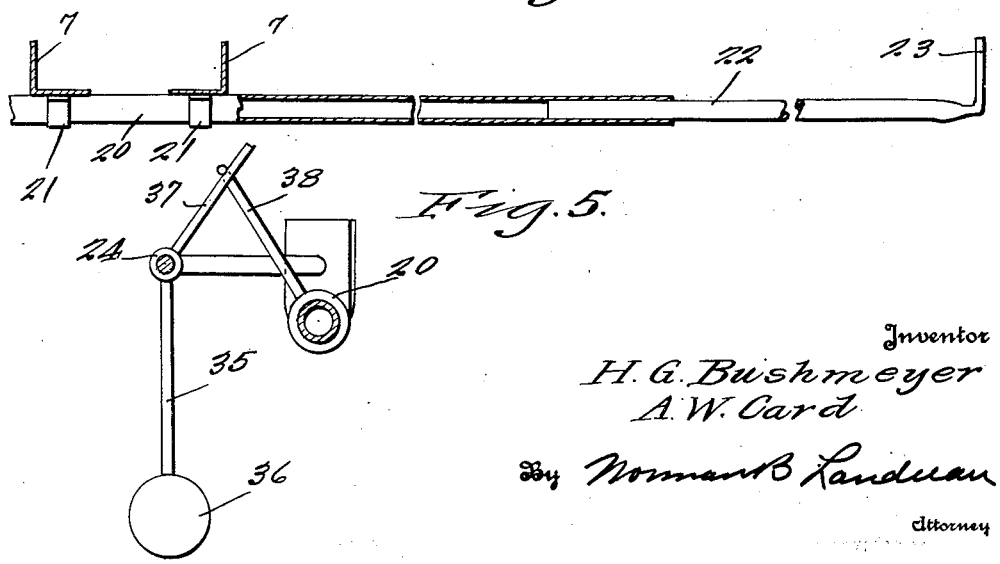

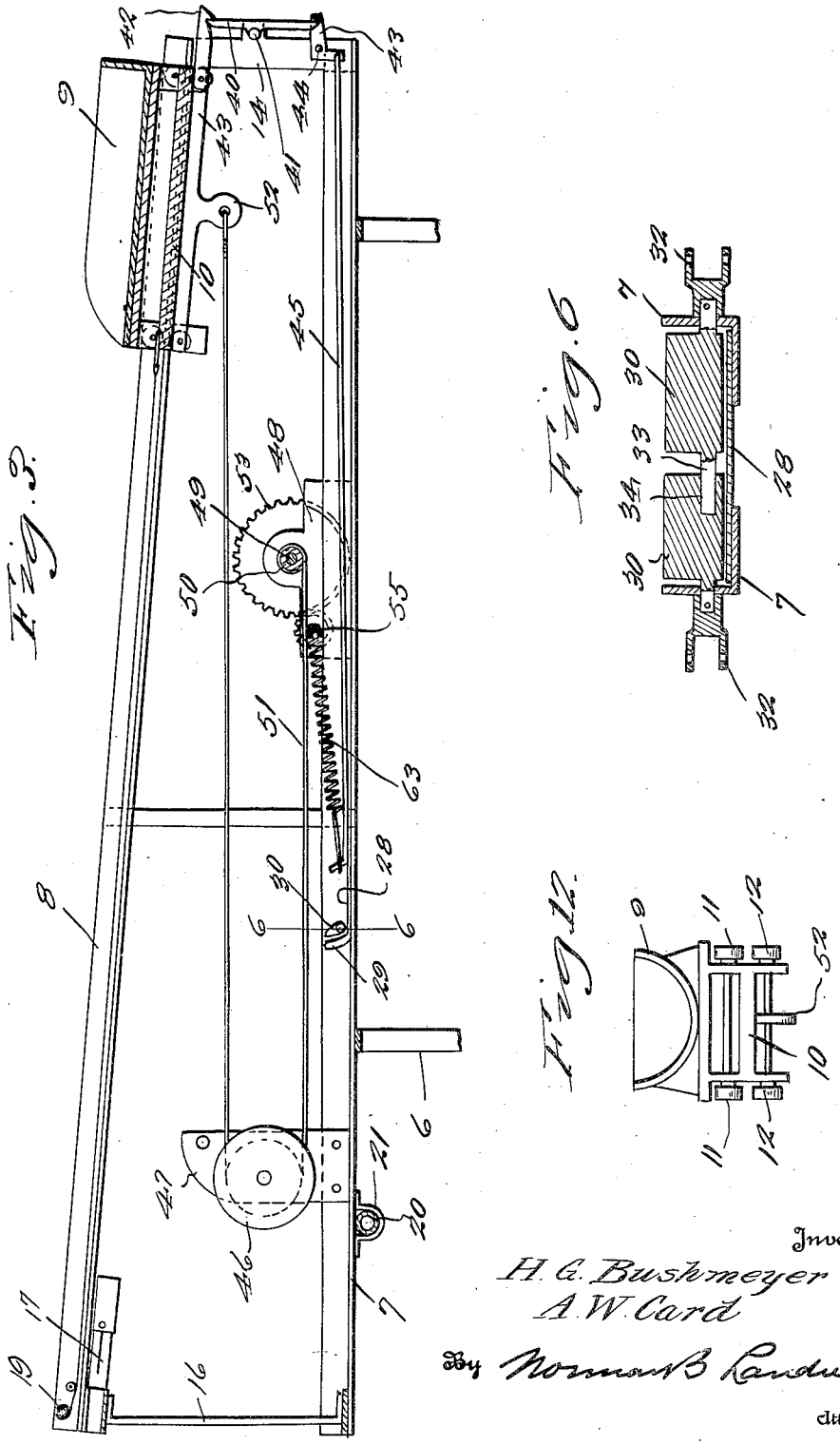

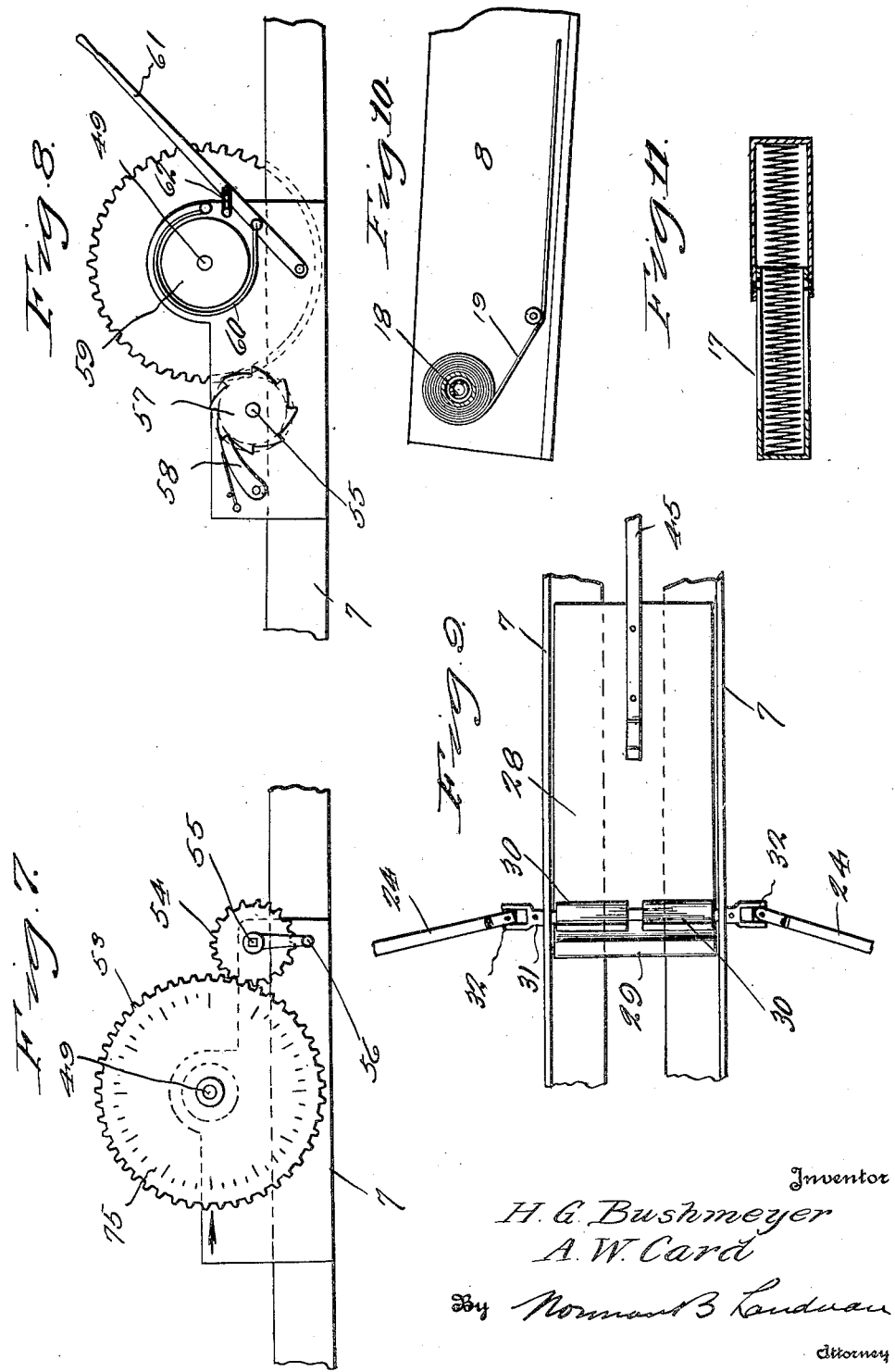

Patented Dec. 27, 1932

1,892,381

UNITED STATES PATENT OFFICE

HENRY G. BUSHMEYER AND ARCHIE W. CARD, OF MINEOLA, NEW YORK, ASSIGNORS TO AERO PICKUP SERVICE CORP., A CORPORATION OF NEW YORK

AIRPLANE PICK-UP DEVICE

Application filed February 23, 1929. Serial No. 342,153.

The present invention relates to a catapult pick-up mechanism designed particularly for use in connection with aircraft so that, for example, an airplane while flying near the ground may pick up additional supply of gasoline, mail, food and other paraphernalia.

The prime object of the invention resides in the provision of means for holding in an extended position a flexible loop which may be engaged by a hook or any other suitable device dangling from an airplane and when so engaged will set into operation a mechanism for shooting into the air in the general direction of the flight of the airplane the paraphernalia to which said flexible loop is attached.

Another very important object of the invention resides in the provision of an apparatus of this nature wherein it is possible to regulate the speed at which the paraphernalia is cast into the air so as to conform as close as possible to the approximate speed of the airplane so as to eliminate sudden retarding jerks on the airplane which might prove disastrous.

A further very important object of the invention resides in the provision in an apparatus of this nature, of means for holding the flexible loop in an extended position and to permit the same being picked up by the airplane without danger of said loop entangling with any part of the apparatus.

Another very important object of the invention resides in the provision of an apparatus of this nature which may be conveniently and compactly mounted in a wheeled chassis such as an automobile chassis whereby the apparatus may be quickly and expeditiously put in the most convenient position with respect to the flight of the airplane.

A still further very important object of the invention resides in the provision of an apparatus of this nature which is exceedingly simple in its construction, inexpensive to manufacture, strong and durable, thoroughly efficient, effective and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the apparatus in a position ready for the airplane to pick up a can of gasoline or other paraphernalia, Figure 2 is a rear elevation thereof, Figure 3 is a vertical longitudinal section therethrough, Figure 4 is a detail section showing the telescopic mounting of one of the rockable bars, Figure 5 is an enlarged detail section taken substantially on the line 5—5 of Figure 2, Figure 6 is an enlarged detail transverse vertical section taken substantially on the line 6—6 of Figure 3, Figure 7 is an enlarged detail view of the gearing associated with the shock cord tensioning mechanism and illustrating indicia whereby the tension may be regulated as desired, Figure 8 is a view from the opposite sides to that shown in Figure 7, Figure 9 is a fragmentary top plan view showing the pair of cams and associated elements utilized in releasing the carriage, Figure 10 is an enlarged detail section illustrating the curtain, Figure 11 is a detail section through the buffer and shock absorber, and Figure 12 is an end elevation of the carriage.

Referring to the drawings in detail it will be seen that the numeral 5 denotes generally a wheeled frame of any preferred construction being shown as an automobile frame.

A pair of inverted U-shaped brackets 6 rise from the wheeled frame 5 for supporting our improved apparatus. A pair of spaced coextensive parallel horizontal angle bars 7 are attached to the brackets 6 in any suitable manner and support thereabove a pair of spaced coextensive parallel angle bars 8 which are inclined upwardly and rearwardly in respect to the wheel frame 5.

These angle irons 8 are in the nature of tracks or rails for a carriage 9 which is mounted on a frame 10 having an upper set of wheels 11 to ride above the rails 8 and a lower set of wheels 12 to ride under the rails 8.

These rails 8 are supported in respect to the bars 7 by suitable members 14, 15 and 16. One or more spring buffers and shock absorbers 17 are supported under the upper ends of the rails 8 and may be of any preferred construction for stopping and absorbing the shock of stopping the carriage 9 as will be more fully appreciated as the description proceeds.

A spring roller 18 has a curtain 19 normally wound thereon and this curtain has an end attached to the carriage 9 so that when the carriage 9 is in its lowermost position as shown in Figure 3 said curtain extends over the space between the rails 8 to prevent objects from dropping down therebetween which might in any way interfere with the efficient operation of the apparatus.

A tube 20 is fastened under the forward intermediate portions of the bar 7 by suitable means 21 and slidably receives bars 22 with upstanding end extensions 23 in which are journaled rocker arms 24 with outer lateral ends 25 over which are telescoped sockets 26 of standards 27.

A plate 28 is slidable on the angle bars 7 and at its rear end has an upstanding shoulder 29. A pair of cams 30 have trunnions 31 rockable in the upstanding flanged portions of the bars 7 and universal joint connections 32 with rocker arms 24.

These cams are interconnected for independent rocking movement by means of a projection 33 extending into a recess 34, the projection 33 being on one cam and the recess 34 being in the other cam as is clearly illustrated in Figure 6.

It will be noted that the rocker arms 24 are angularly disposed to the bars 22 and angularly disposed in respect to each other diverging outwardly and rearwardly from each other so that when the standards 27 rock downwardly and rearwardly they move toward each other for a purpose which will be brought out later in the description.

A rod 35 extends downwardly from the intermediate portion of each rocker arm 24 and has a counterbalance weight at the lower end thereof tending to maintain a rod 37 in engagement with a stop 38 projecting from the tube 20 so that the standards 27 incline slightly upwardly and forwardly in respect to the wheeled frame 5.

A trigger 40 is pivotally mounted as at 41 between members 14 for engaging a catch 42 formed on a bar 43A under the carriage 9 and also engaging a pivoted catch 43 pivoted as at 44 between the lower ends of the member 14. A link 45 connects the catch 43 with the plate 28. A sheave or pulley 46 is journaled between members 47 rising from the bars 7. Bearings 48 remote from members 47 have journaled therein a shaft 49 on which is fixed a drum 50. Associated with this drum is a shock cord 51 in the nature of an elastic cable.

This shock cord 51 is trained over the pulley 46 and attached to a lug 52 depending from the bar 43A under the carriage 9 so that when the shock cord is under tension said carriage 9 is urged to move up the inclined rails 8.

A relatively large gear 53 is on one end of the shaft 49 and meshes with a relatively small gear 54 on a shaft 55 journaled in the bearings 48 and a crank 56 or the like is provided for rotating this shaft 55.

At the other end of the shaft 55 there is fixed a ratchet wheel 57 with which is associated a spring pressed pawl 58 mounted on the adjacent bearing 48. A brake drum 59 is mounted on the shaft 49 and a brake band 60 is associated therewith and operable by a lever 61 which is held in an inactive position by a suitable link or the like 62. The purpose of the brake described in the above line is to stop a too sudden and violent backward movement after the carriage is released and contacts with the buffer or shock absorbers 17.

One end of a spring 63 is engaged with the rear end of the link 45 and the other end to bearing 48 by any suitable means to urge the link 45 and plate 28 forwardly. The numeral 70 denotes a flexible loop preferably constructed of shock cord or equivalent material. This loop is held in an extended position by being engaged over the hooks 71 on the upper end of the standard 27 and then disposed to extend between said standards and be attached to paraphernalia 72 on the carriage 9.

The carriage 9 is then moved downwardly or forwardly on the rails 8 until the catch 42 is engaged with the trigger 40 and the catch 43 also engaged with said trigger 40. Crank 56 is actuated to wind the shock cord on the drum 50 until the desired tension is acquired, which is ascertained by using indicia 75 on the gear 53.

The tension placed on the shock cord 51 will be governed by the estimated speed of the airplane. I have indicated an airplane by the numeral 77 with a hook or grapple member 78 of suitable structure dangling therefrom by means of a cable or shock cord 79 or in any other suitable manner.

The airplane is manouvered so that the element 78 travels between the standards 27 under the uppermost portion of the shock cord or loop 70 and of course said loop 70 is caught in the member 78 and pulled along with the airplane causing the rocking of the standards 27 rearwardly and downwardly at which time they move inwardly toward each other so that the shock cord 70 as the slack is taken up therein readily frees itself from the hooks 71. Now as the standards 27 are rocked forwardly the rocker arms 24 rock the cams 30 to cause the sliding of the plate 28 and the link 45 against the tension of the spring 63 to thereby rock the catch 43 free from the trigger 40 so that the carriage 9 is released and immediately moves forwardly and upwardly in a general direction of the airplane so that said carriage is moving at approximately the same speed as the airplane when the slack in the loop 70 is fully taken up and thereby avoiding any sudden jerk which would suddenly retard the speed of the airplane.

As the carriage reaches the end of its travel the shock of stopping the same is absorbed by the shock absorber or buffer structure shown by way of example in Figure 11.

When the apparatus is not in use, the bars 22 may be slid inwardly of the tubes 20 to bring the upstanding end extension 23 within the confines of the wheels of the wheel frame 5. Of course at this time the universal connections 32 are unfastened. The standards 27 may be easily lifted off the ends 25 of the rockers 24 and thus the apparatus may be moved from place to place without difficulty.

In addition to the practical advantages hereinbefore set forth, our novel apparatus is obviously simple, strong and durable.

We have entered into a detail description of the construction and relative arrangement of parts embraced in the preferred and present embodiment of our invention in order to impart a full, clear and exact understanding of said embodiment.

This embodiment has been selected because in actual practice it attains the features of advantage enumerated as desirable in the statement of the invention and the above description. We do not desire it however, to be understood as confining ourselves to the specific construction and relative arrangement of parts inasmuch as in the future practice of the invention various changes and modifications may be made such as fall within the scope of our invention and appended claims.

Having thus described our invention, what we claim as new is:

1. In an apparatus of the class described, a trackway, a carriage movable on the trackway, means under tension for urging movement of the carriage in one direction, releasable means for holding the carriage against said movement, a mechanism for holding a flexible member attached to paraphernalia in the carriage in an extended position, and means operatively connecting said mechanism with said holding means for said carriage.

2. In an apparatus of the class described, a trackway, a carriage movable on the trackway, means under tension for urging movement of the carriage in one direction, releasable means for holding the carriage against said movement, a mechanism for holding a flexible member attached to paraphernalia in the carriage in an extended position, means operatively connecting said mechanism with said holding means for said carriage, and means associated with the means for urging the carriage into motion whereby the speed of said motion may be varied.

3. In an apparatus of the class described, a trackway, a carriage slidable on the trackway, a shock cord engaged with the carriage, means for tensioning the shock cord to urge the carriage in one direction, releasable anchoring means associated with the carriage, a pair of standards, means for rockably mounting the standards, and means operatively connecting the rockable mounting means with the holding means to actuate the latter when said standards are rocked.

4. In an apparatus of the class described, a trackway, a carriage slidable on the trackway, a shock cord engaged with the carriage, means for tensioning the shock cord to urge the carriage in one direction, releasable anchoring means associated with the carriage, a pair of standards, means for rockably mounting the standards, means operatively connecting the rockable mounting means with the holding means to actuate the latter when said standards are rocked, and a mobile support on which said apparatus is mounted.

HENRY G. BUSHMEYER.
ARCHIE W. CARD.